United States Patent [19]

Friedman

[11] 3,745,261

[45] July 10, 1973

[54] TELEPHONE SET SPEECH NETWORK

[75] Inventor: Stanley Joel Friedman, Indianapolis, Ind.

[73] Assignee: Bell Telephone Laboratories, Incorporated, Murray Hill, N.J.

[22] Filed: Sept. 20, 1971

[21] Appl. No.: 182,060

[52] U.S. Cl. .......... 179/81 R, 179/81 A, 179/81 B, 179/170.6, 179/170.8

[51] Int. Cl. .......... H04m 1/76

[58] Field of Search .......... 179/81 R, 81 A, 81 B, 179/1 HF, 81 C, 16 F, 170 NC, 170.2, 170.6, 170.8

[56] References Cited

UNITED STATES PATENTS

| | | | |
|---|---|---|---|
| 3,602,648 | 8/1971 | Holtz | 179/81 A |
| 3,483,335 | 12/1969 | Plotrowski | 179/170.8 |
| 3,504,127 | 3/1970 | Slana | 179/16 F |
| 3,064,084 | 11/1962 | Meacham | 179/81 A |
| 2,645,681 | 7/1953 | Green | 179/81 A |
| 3,582,563 | 6/1971 | Cragg | 179/81 A |
| 3,596,011 | 7/1971 | Alexandrovich | 179/81 B |
| 3,300,584 | 1/1967 | Jeanlin | 179/170.6 |

*Primary Examiner*—Ralph D. Blakeslee
*Attorney*—W. L. Keefauver et al.

[57] ABSTRACT

In an electronic type telephone set employing an active resistive hybrid network in combination with separate transmit and receive feedback amplifiers, automatic equalization in terms of both frequency and volume is achieved by the use of a respective photoresistive device in each of the amplifier feedback paths. Each of the photoresistive devices is optically coupled to a common light-emitting diode in a line current sensing circuit that forms an integral part of the active resistive hybrid network.

7 Claims, 11 Drawing Figures

TRANSMIT AMPLIFIER & EQUALIZER

TELEPHONE SET SPEECH NETWORK

BACKGROUND OF THE INVENTION

1. Field of the Invention

This invention relates to speech networks in subscriber telephone sets and, more particularly, to speech networks that include equalization circuits.

2. Description of the Prior Arts

In telephony it is obviously undesirable to permit the distance between a calling and a called subscriber to dictate the level and quality of transmission. The problem actually has two primary aspects. The first concerns transmission losses or distortions that arise from differences in transmission path length, whether microwave, radio, or cable, between central offices; this part of the problem is conventionally met by the use of repeaters that boost or amplify and by the use of central office equalization networks that compensate either for differences in level, or frequency, or both.

The second aspect of the problem concerns the need to compensate for differences in individual subscriber loop length, the transmission path between the subscriber and the central office. In the prior art this problem has typically been solved in part by the use of an equalizer circuit of circuits in the voice network of each telephone subscriber set. U.S. Pat. No. 2,645,681 issued to E. I. Green on July 14, 1953, is illustrative. Green discloses an equalizer arrangement that employs two negative temperature coefficient resistance elements, such as thermistors for example, one in shunt connection with the transmitter of a telephone station set. Both of these elements are thermally coupled to an electrical heating filament, the heat energy transfer to the shunt elements from the filament varying inversely with the resistance of the telephone loop. Variants of Green's equalizer are shown in U.S. Pat. No. 2,604,543 issued July 22, 1952 to W. D. Goodale, Jr. and in U.S. Pat. No. 2,732,436 issued Jan. 24, 1956 to A. J. Aikens, N. Botsford, A. P. Boysen, Jr., E. Dietze, W. D. Doodale, Jr. and A. H. Inglis.

Still another prior art variant of Green's equalizer is that shown in U.S. Pat. No. 3,582,563 issued June 1, 1971 to W. D. Cragg where a lamp supplied with line current controls the resistivity of photoresistors connected across the transmitter and receiver.

Although prior art equalizers of the type indicated have been reasonably effective in certain specific circuit environments, there has heretofore been no suggestion as to how fully adequate equalization in terms of both signal level and frequency may be attained in the environment of an all electronic telephone set employing amplification for both transmission and reception, electromagnetic transducers and active resistive hybrids.

Accordingly, a broad object of the invention is to improve the equalization circuits in subscriber telephone set speech networks. A more specific object is to incorporate effective equalization into the environment of an all electronic telephone station set.

SUMMARY OF THE INVENTION

The foregoing objects and additional objects are achieved in accordance with the principles of the invention by the use of a light-emitting diode (LED) as a line current sensing device which, in effect, measures the length of the subscribers' loop in terms of a small fraction of line current, thus determining the level of equalization that must be applied in order to maintain uniformity of both transmission and reception insofar as both frequency and amplitude are concerned. In accordance with one important feature of the invention, the LED is incorporated in a sensing circuit which in turn is an integral part of an active resistive hybrid network. The sensing circuit operates to drain off a very small fraction (i.e., less than 1 percent) of the current in the hybrid so that the functioning of the hybrid is virtually unaffected.

In accordance with a further aspect of the invention, the sensing function indicated is achieved without adding any additional voltage drop into the loop path.

In accordance with another feature of the invention, an operational amplifier is connected in both the receive and transmit paths of the speech network. Each of these amplifiers employs a respective feedback network that includes a photoresistive device that is optically coupled to the LED in the hybrid circuit.

DETAILED DESCRIPTION

GENERAL CIRCUIT STRUCTURE

Figure 1:
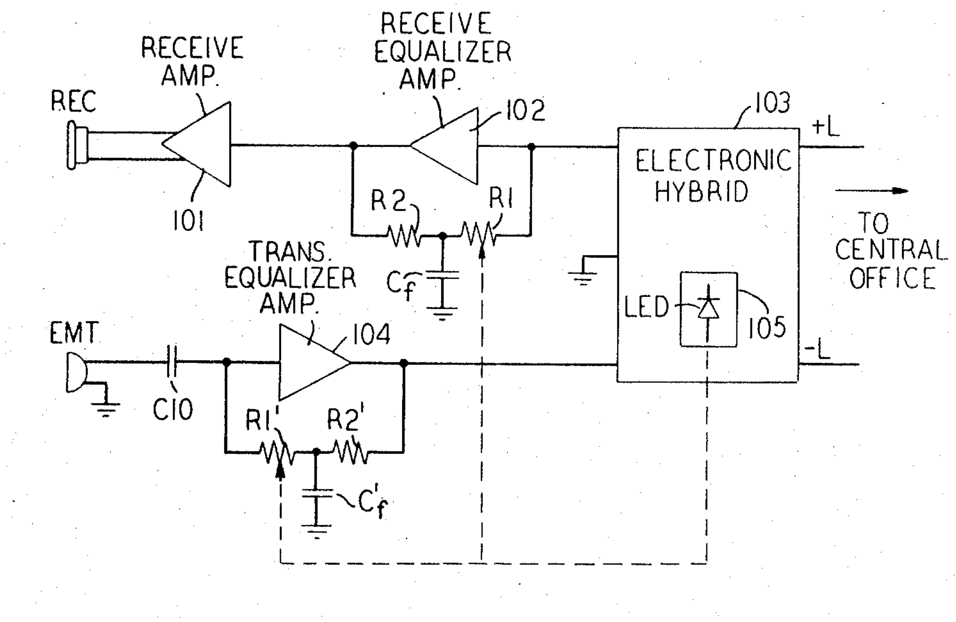
FIG. 1 is a combination block diagram and schematic circuit diagram of a telephone set speech network in accordance with the invention.

As shown in FIG. 1, an electronic telephone set in accordance with the invention employs optical coupling, indicated by the broken line, to obtain both frequency and level equalization with changes in d.c. loop current which reflects loop length. The electronic hybrid 103 is an active solid-state circuit that performs the functions normally done by the conventional multiwinding transformer hybrid currently employed in the typical commercial telephone set. The electronic hybrid 103 includes a current-sensing circuit 105 which employs a light-emitting diode LED that senses loop current. The LED is optically coupled to light-sensitive resistors or photoresistors R1 and R1' in the respective equalizer feedback loops of the receive equalizer-amplifier 102 and of the transmit equalizer-amplifier 104. The receive equalizer-amplifier 102 and its feedback loop are designed in accordance with the invention to provide a rising frequency response and gain. In accordance with the invention, this rising response is approximated by a single "zero" in the characteristic transmission frequency response equation of the amplifier. As the resistance of the photoresistor R1 is made to vary with loop length, the "zero" location changes correspondingly so that in effect it tracks the dominant pole of the transmission line and, at the same time, changes the gain. The receive equalizer 102 also provides additional constant gain to drive the receiver by way of a separate received amplifier 101.

An electromagnetic transmitter EMT drives the transmit equalizer-amplifier 104 by way of a coupling capacitor C10. This amplifier may advantageously be similar to the receive equalizer-amplifier 102 and provides both the variable frequency shaping and gain needed to drive the hybrid 103 in the transmit direction.

CIRCUIT DESIGN CONSIDERATIONS

Figure 2:
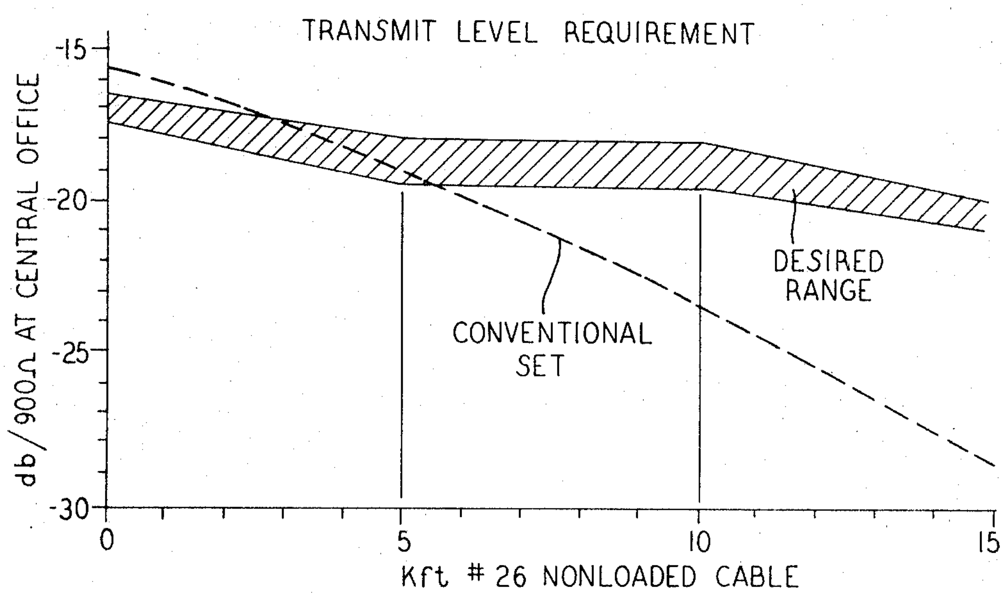
FIG. 2 is a plot of the transmit level requirements of a set in accordance with the invention in terms of loop length.
Figure 3:
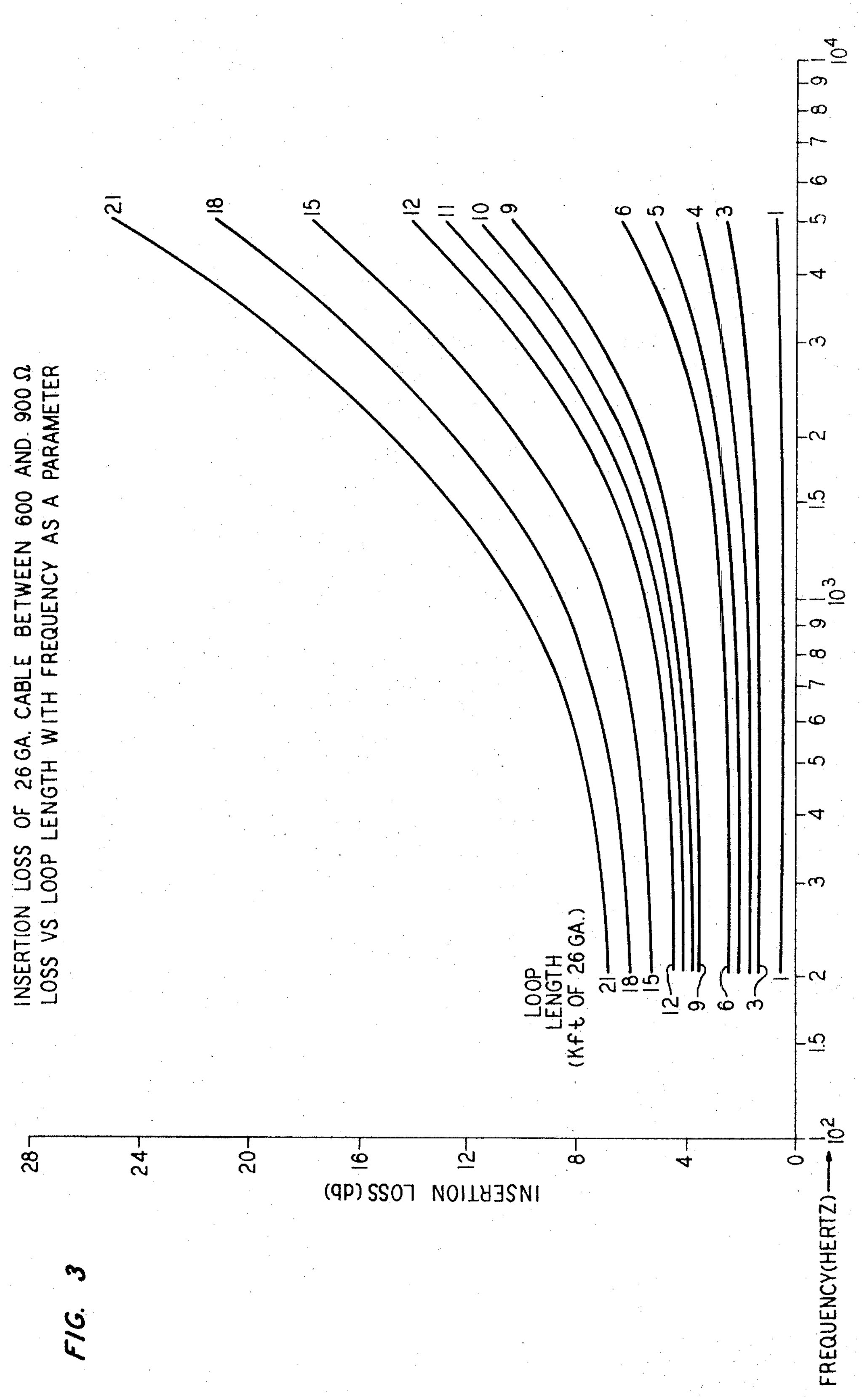
FIG. 3 is a plot of insertion loss versus frequency over various loop lengths for a set in accordance with the invention.

It is evident that the characteristics of the transmit equalizer-amplifier 104 must compensate for the insertion loss of the loop, based on a particular cable size (such as 26 gauge) as the loop changes over some finite range, between zero and 15 kilofeet, for example, with an adjustment for desired central office signal level being made. This problem is illustrated by the plot of FIG. 2. Typical insertion loss between 600 and 900 ohms for 26 gauge cable plotted against loop length with frequency as a parameter is illustrated in FIG. 3.

As indicated above, an important aspect of the design problem involved in tailoring a particular circuit in accordance with the invention is to cancel the transmission line pole that varies with loop length. It may be shown that cable insertion gain $T_C$ may be expressed as follows:

$$T_C = (R_s + R_L/R_s + R_L + R_l)\ (1/1 + S/\omega_o\ (l)), \quad (1)$$

where:

$R_s$ = set impedance ( =600 ohms)

$R_L$ = ac load at CO ( =900 ohms)

$R$ = loop resistance ohms per kilofoot $L$ = loop length, kilofeet $\omega_o(l)$ = frequency of dominant transmission pole at loop length $l$.

Figure 4:
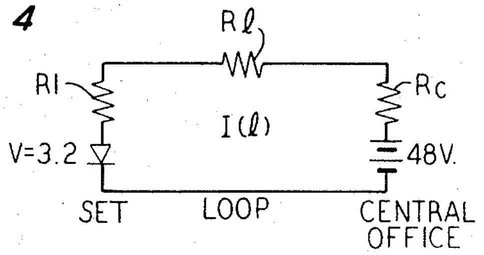
FIG. 4 is a simplified schematic d.c. circuit diagram of a telephone set in a central office loop connection.
Figure 5:
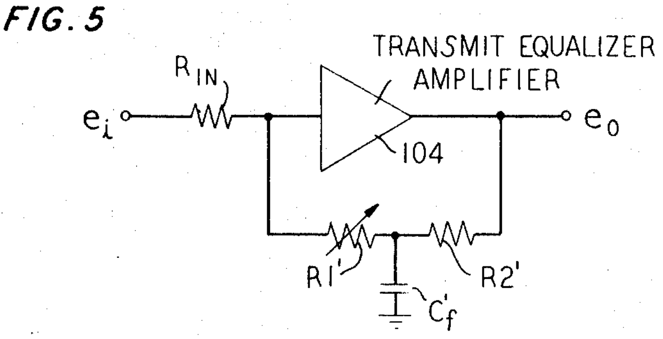
FIG. 5 is a simplified schematic circuit diagram of an equalizer circuit in accordance with the invention.

In implementing the feature of canceling the transmission line pole, the corresponding zero that varies with loop length is simulated, as indicated above, by using a feedback amplifier in the manner illustrated by FIG. 5. The variable element in the design is the photoresistor R1′ which, as previously described, is optically coupled to a LED driven by a fraction of the loop current. The loop current may be determined from the model of the central office loop and telephone set shown in FIG. 4, where:

$R$ = 83.5 ohms/kilofoot $Rl$ = 70 ohms $R_c$ = 400 ohms $I$ (0 Kft) = 95.5 ma $I$ (5 Kft) = 50.5 ma $I$ (10 Kft) = 34.3 ma $I$ (15 Kft) = 26.0 ma.

For convenience, the transmit equalizer-amplifier 104 with its feedback loop, which is shown as a part of FIG. 1, is shown independently in FIG. 5. In considering FIG. 5 alone, it may be shown that the equalizer insertion gain $T_E$ may be expressed as follows:

$$T_E = e_o/e_i = R1' + R2'/R_{in}\ [\ 1 + (S/\omega')\ ], \quad (2)$$

where $$\omega' = \frac{1}{C\dfrac{R1'R2'}{R1'+R2'}}. \quad (3)$$

Making R1′, the photoresistor, a function of loop current makes $$R1' = R1'\ (l) \quad (4)$$

and $$\omega' = \omega'(l \quad (5)$$

The complete insertion gain T for the equalizer and cable may then be expressed as follows:

$$T = T_E T_C$$
$$= R1'\ (1) + R2'/R_{in}\ \{\ 1 + (S/\omega'\ (l))\ \}\ R_L + R_S/R_S + R_L$$
$$= Rl\ 1/1 + S/\omega_o(l), \quad (6)$$

which becomes a constant (flat frequency response) when $\omega'(l) = \omega_o\ (l)$.

As indicated above, the primary problem in carrying out the principles of the invention is to adjust the position of the zero of the amplifier as required by the limitations illustrated by the plot of FIG. 3. Given a specific photoresistor device, the only parameters available to effect the necessary adjustment are the resistor R2 and capacitor C. Accordingly, the zero can be matched at only two loop lengths. Thus, for example, 5 kilofeet and 15 kilofeet may be chosen as the key loop lengths for a particular design. After the zero shift is chosen, it is necessary to be sure that the spread in d.c. or low frequency gain is within the allowed limits, as defined by FIG. 2. The zero loop d.c. gain may then be adjusted by selecting a suitable value for $R_{in}$.

To find the magnitudes of the resistor R2 and the capacitor C, note that:

$$\omega'(5) = R1\ (5) + R2/R1\ (5)\ R2\ C \quad (7)$$

and $$\omega'(15) = R1\ (15) + R2/R1\ (15)\ R2\ C. \quad (8)$$

Simultaneous solution of these equations gives the following:

$$R2=\frac{R1(5)[1-\omega'(5)/\omega'(15)]}{\left[\frac{R1(5)}{R1(15)}\frac{\omega'(5)}{\omega'(15)}-1\right]} \quad (9)$$

and $$C = R1\ (15) + R2/R1\ (15)\ R2\ \omega'(15). \quad (10)$$

In order to meet the d.c. gain spread requirement, the resistor values must satisfy the following constraint:

$$20 \log [\ R1\ (15) + R2/R1\ (5) + R2\ ] = 2.0 \text{ db}. \quad (11)$$

Figure 6:
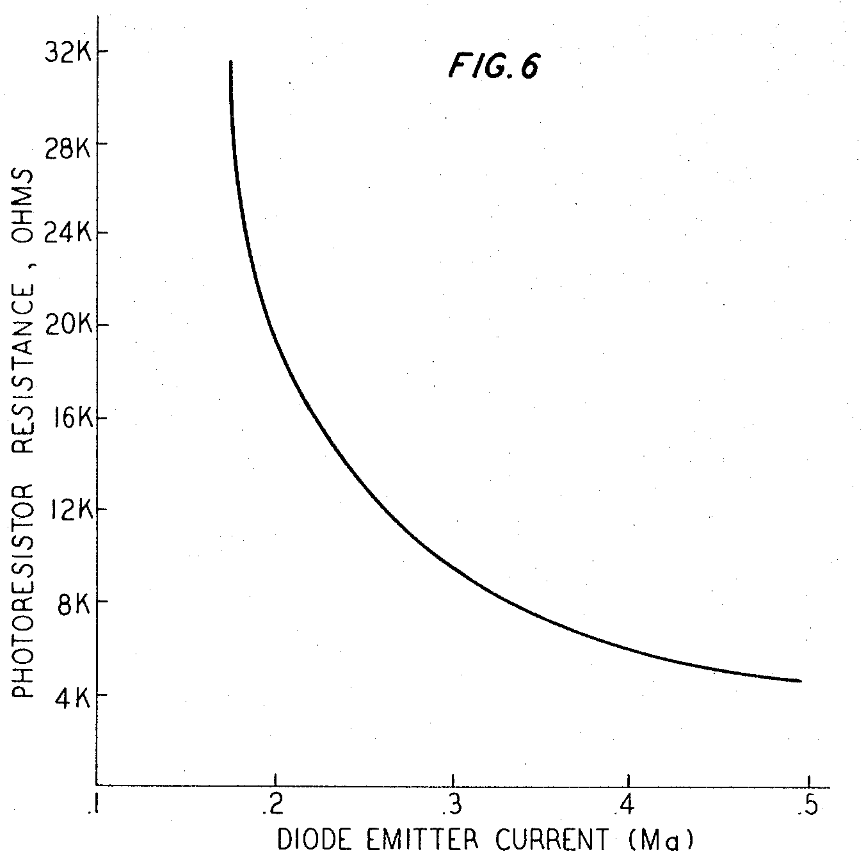
FIG. 6 is a plot of teh transmission characteristics of a typical photoresistor.

In one embodiment of the invention the photoresistor employed was a commercially available device identified as Monsanto MCR-1. The characteristic for one of these devices is shown in FIG. 6, and the magnitude for the photoresistor R1 may thus be conveniently picked from a curve of this type. Note that the slope of the curve of FIG. 6 or the ratio of resistance obtained for the two values of current determines the range of the amplifier zero. Actually, if the resistance ratio is less than the ratio of the zero frequencies, then the required magnitude for the resistor R2 is negative and not realizable with a single simple resistive element. In accordance with the invention, however, this ratio can be improved by shunting the light-emitting diode LED with a resistor, thus subtracting out a constant current and shifting the resistance obtained to the left on the curve. By this means, the R versus I curve of the photoresistor may be artificially steepened.

TRANSMIT AMPLIFIER-EQUALIZER CIRCUIT DETAILS

Figure 7:
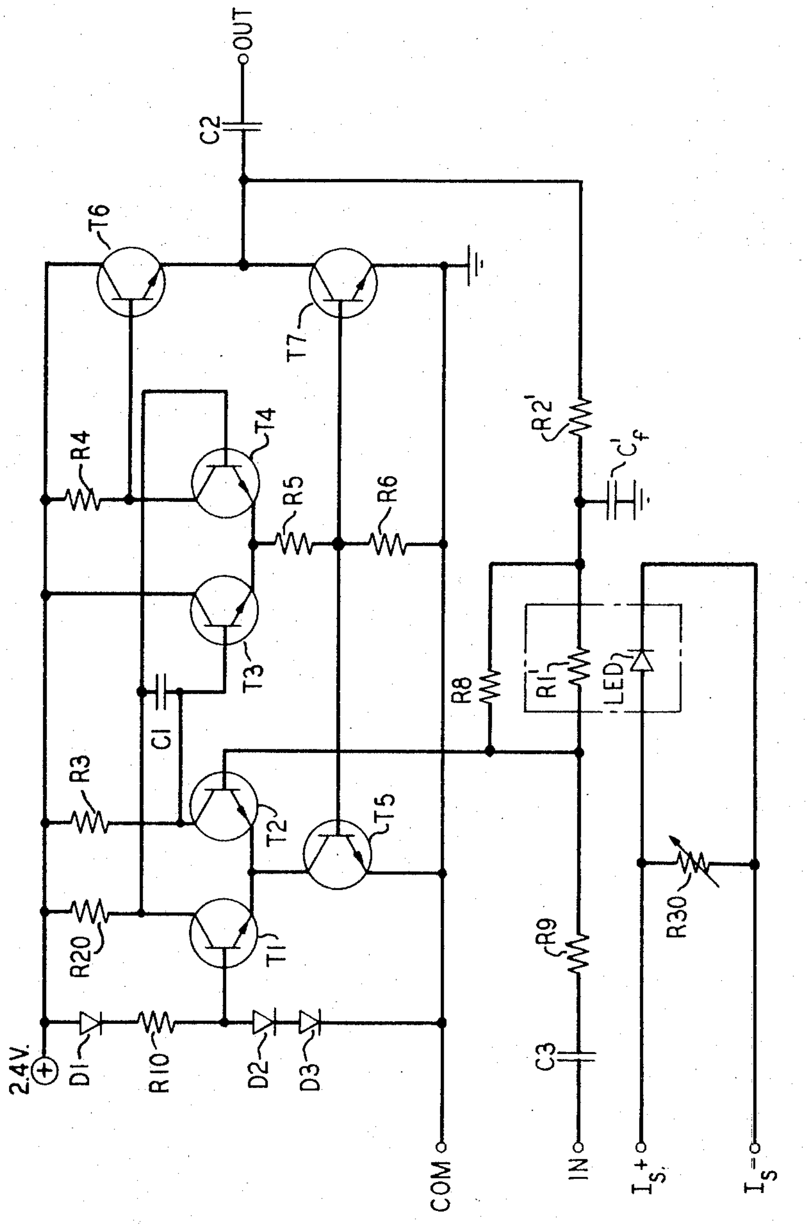
FIG. 7 is a schematic circuit diagram of the transmit amplifier-equalizer circuit shown in block form in FIG. 1.

Details of the transmit amplifier-equalizer circuit are shown in FIG. 7, together with the light-emitting diode LED which although optically coupled to the photoresistor R1' is physically connected in the hybrid circuit 103. Transistors T1 and T2 form a first differential input stage with transistors T3 and T4 making up a second differential stage with a single ended output. An output stage is provided by transistor T6 and appropriate biasing levels are made available by diodes D1, D2 and D3, by resistors R10, R5 and R6, and by transistors T5 and T7. Resistors R20, R3 and R4 are load devices for the respective differential stages. Capacitors C2 and C3 provide coupling, capacitor C1 provides frequency compensation and resistor R9 is an input resistor. The parallel combination of the resistors R1' (which is a photoresistor) and R8, along with resistor R2' and capacitor C/' forms the T feedback circuit which is employed, in accordance with the invention, to establish the zero of the amplifier as the light output of the LED varies. Resistor R8 is employed to set a maximum value for the variable element R1' of the T feedback loop while resistor R30 is used to shift the current axis of the LED response by shunting off some of the current. Details of the receive equalizer-amplifier 102 of FIG. 1 are substantially identicaL to those of the transmit equalizer-amplifier described above and shown in FIG. 7.

HYBRID REGULATOR CIRCUIT DETAILS

Figure 8:
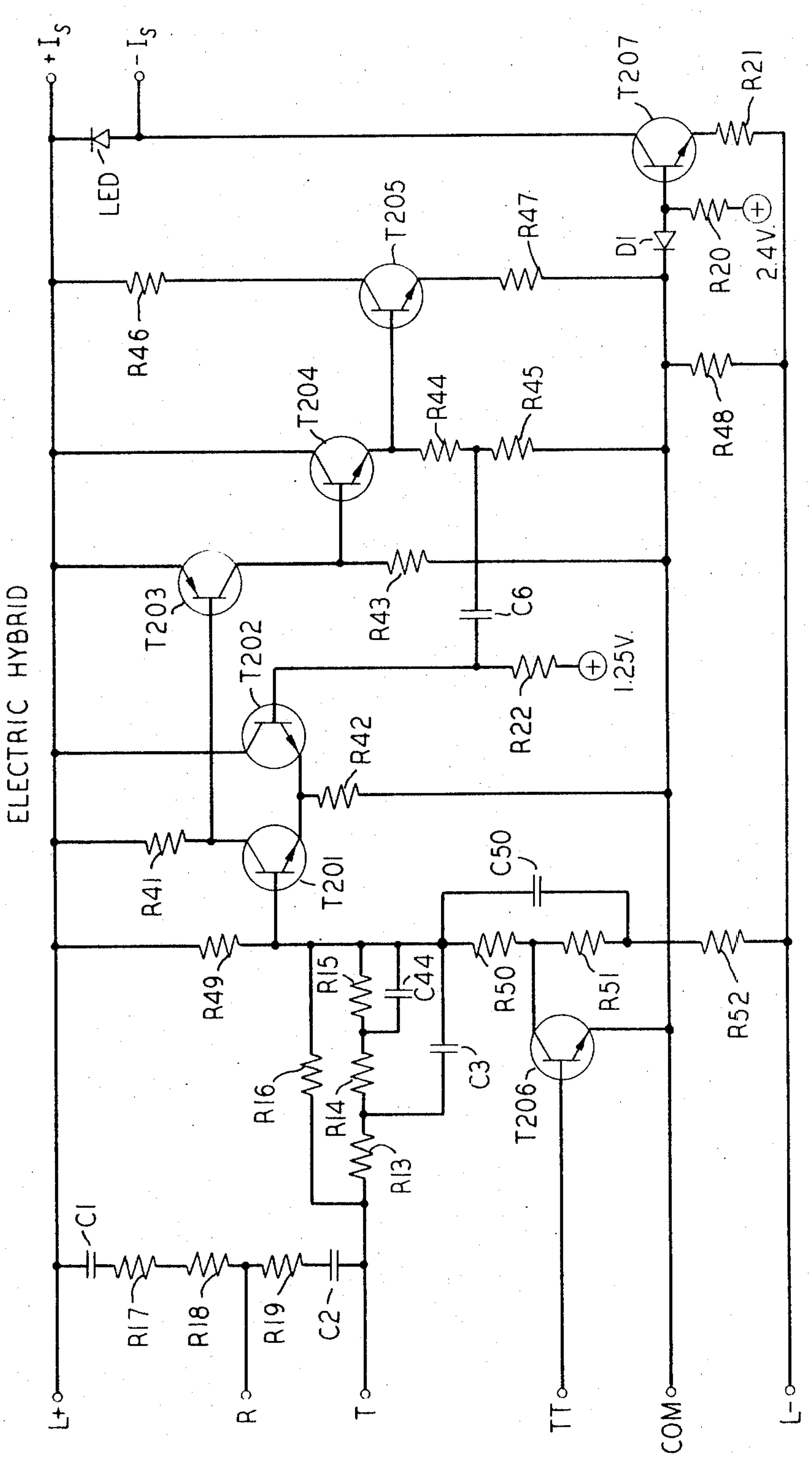
FIG. 8 is a schematic circuit diagram of the hybrid shown in block form in FIG. 1.

The hybrid regulator circuit, shown in detail in FIG. 8, performs the standard a.c. hybrid functions, determines the a.c. input impedance, and regulates the d.c. line current to follow a desired characteristic. Additionally, in accordance with the features of the invention, the hybrid, as indicated above, incorporates a line current sensing circuit (circuit 105 of FIG. 1) as an integral part thereof. The basic amplifier, which forms a part of the hybrid circuit, employs transistors T201, T202, T203 and T204 together with conventionally utilized biasing and load resistors which include resistors R41 through R45 and capacitor C6. Feedback, both a.c. and d.c., for the amplifier is provided by a circuit which includes resistors R16, R48, R50, R51, R52 and capacitor C50. Resistors R50, R51 and R52, along with resistor R49, also provide biasing.

Transistor T205 is a current source output stage and the resistors R46 and R47 provide power dissipation. A balancing network, which has an impedance which is a multiple of the transmission line impedance, is provided by the resistors R13, R14, and R15, together with the capacitors C3 and C44.

Resistors R17, R18 and R19 form a voltage divider for obtaining appropriate sidetone balance and for providing a receive path. Capacitors C8 and C2 provide coupling and transistor T206, which is saturated during dialing, causes the d.c. circuit resistance of the hybrid to change.

The loop length or loop current-sensing circuit (105 of FIG. 1) employs the combination of the light-emitting diode (LED) together with a diode D1, a transistor T207, and resistors R20 and R21. The resistor R20 and the diode D1 provide conventional biasing. Virtually all of the line current flows through the resistor R48 whereas the resistor R21 is carefully proportioned to drain only approximately three quarters of 1 percent of the loop current through transistor T207, which drives the LED.

OVERALL RESPONSE CHARACTERISTICS

Figure 9:
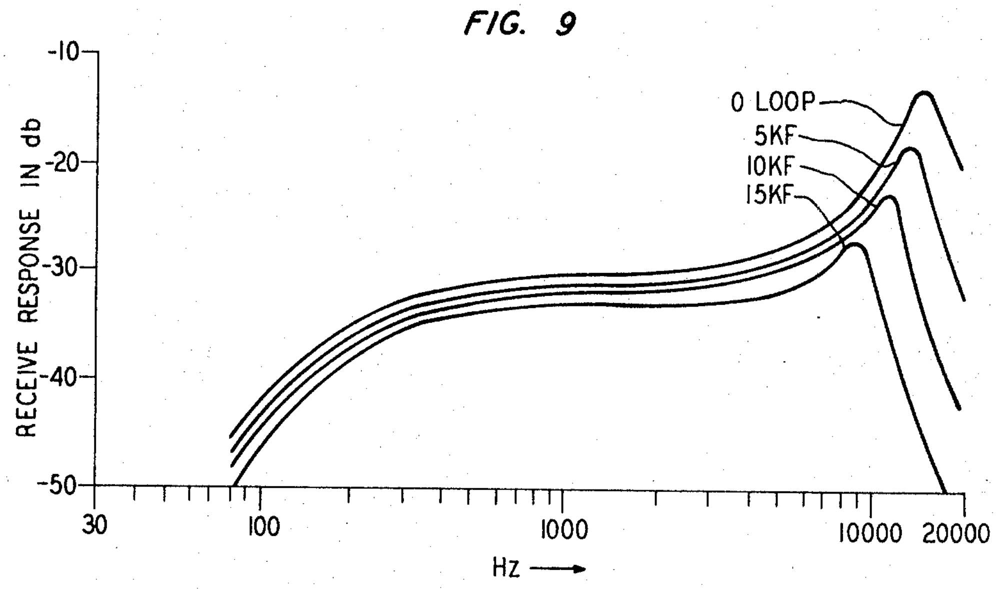
FIG. 9 is a plot of the receiver response characteristics of the set of FIG. 1.
Figure 10:
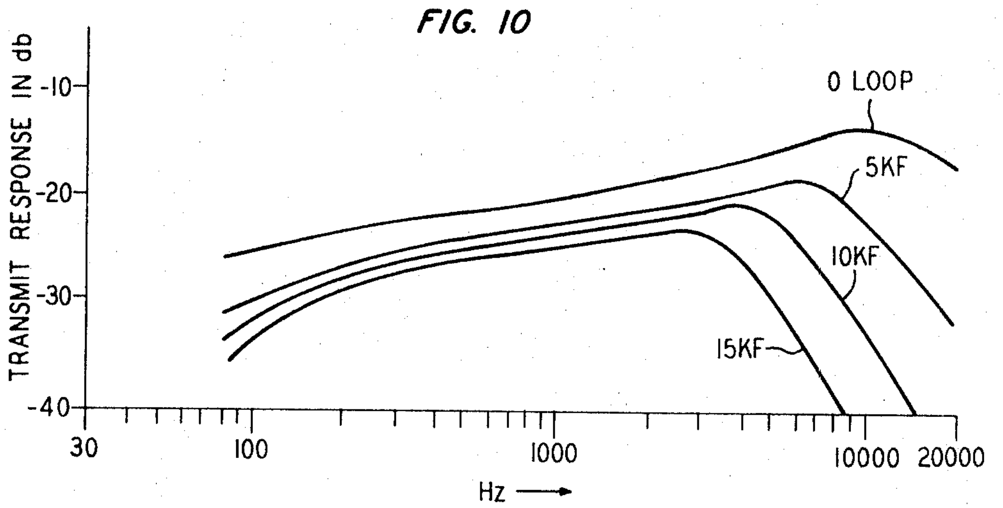
FIG. 10 is a plot of the transmit response characteristics as seen from the central office in FIG. 1.

The transmit and receive response characteristics of a telephone set, in accordance with the invention, are shown in FIGS. 9 and 10, respectively. In each case, the response is shown for various loop lengths and the characteristics in each instance of course include the effects of the equalizer. As shown, the 5, 10 and 15 kilofeet curves are relatively close together, while the zero loop currents are several db higher. This difference is a result of designing the circuitry to match a theoretically ideal response at each of two specific loop lengths, 5 kilofeet and 15 kilofeet. The circuitry could, of course, be readily adjusted to provide optimum response on a zero loop and 15 kilofeet loop.

Figure 11:
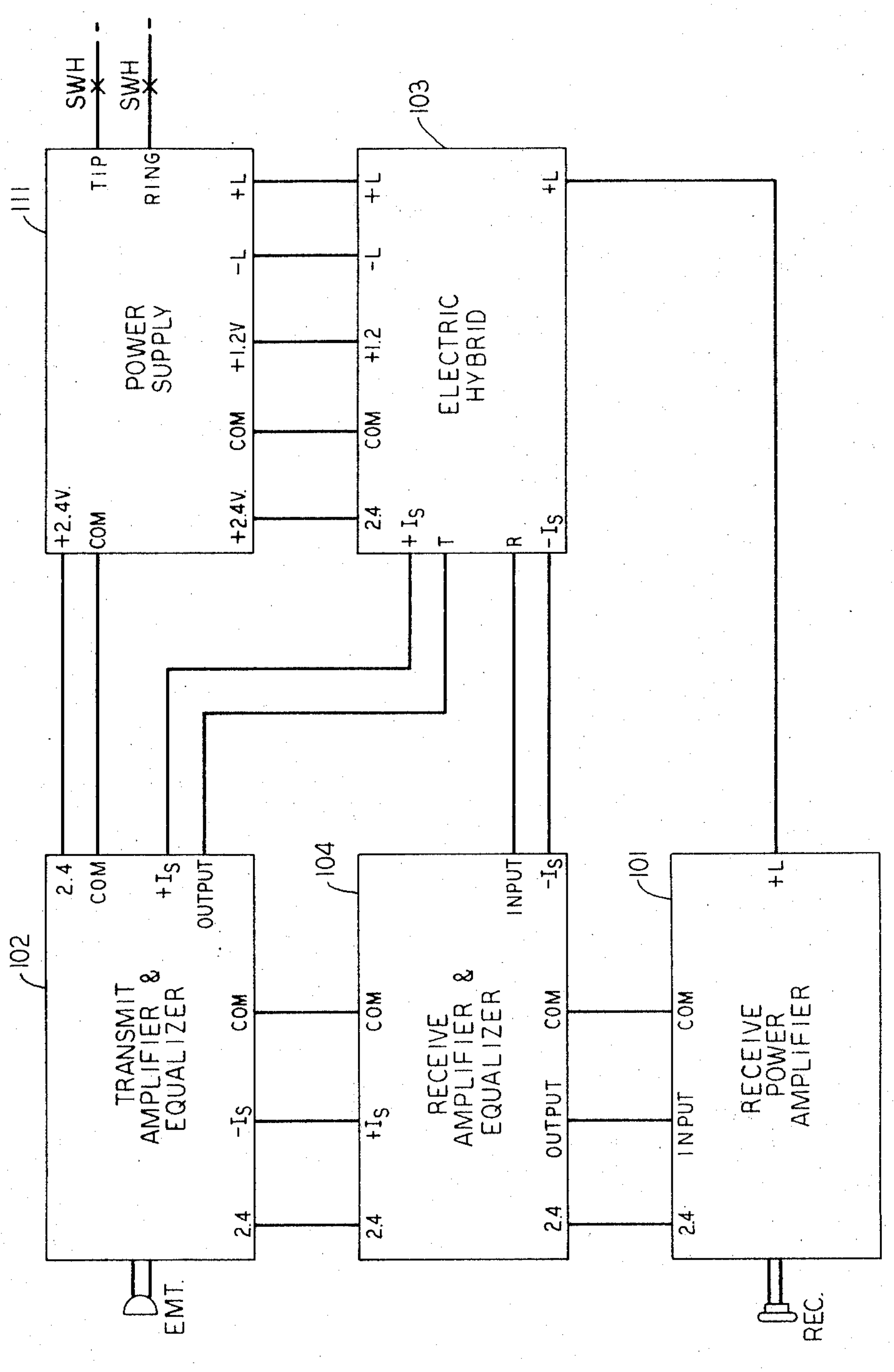
FIG. 11 is an interconnection diagram for the set of FIG. 1.

FIG. 11 shows diagramatically the specific interconnections between the principal functional units that are required for a telephone set in accordance with the invention. The receive power amplifier 101 may be substantially conventional. In one embodiment, for example, a solid-state differential operational amplifier has been employed, which is designed for fabrication by integrated circuit techniques. The power supply 111 may also be conventional, employing diodes for example to modify the line voltage as necessary to obtain the potential levels indicated.

It is to be understood that the embodiment described herein is merely illustrative of the principles of the invention. Various modifications thereto may be effected by persons skilled in the art without departing from the spirit and scope of the invention.

What is claimed is:

1. A speech network for a telephone set comprising, in combination,
 a transmit path including a transmitter and a transmit equalizer-amplifier having a feedback loop with an equalizer network connected therein,
 a receive path including a receiver and a receive equalizer-amplifier having a feedback loop with an equalizer network therein, and
 an active resistive hybrid network including a line current-sensing circuit,
 said hybrid connecting said transmit and receive paths to common line terminals,
 said sensing circuit including means responsive to the level of said line current for generating light without additional voltage loss in said set, and
 each of said equalizer networks including a respective photoresistive device optically coupled to said light generating means,
 whereby said equalizer networks control both frequency and amplitude equalization in said paths.

2. Apparatus in accordance with claim 1 wherein said light generating means comprises a light-emitting diode.

3. Apparatus in accordance with claim 2 wherein said sensing circuit includes a conducting path between said line terminals,
 said path including the series connected combination of said light-emitting diode, the collector-emitter path of a current controlling transistor and a resistive device,
 said light-emitting diode being connected in the collector circuit of said transistor and said resistive device being connected in the emitter circuit of said transistor.

4. Apparatus in accordance with claim 3 wherein a biasing diode is connected between the base electrode of said transistor and a reference potential.

5. Apparatus in accordance with claim 4 further including a biasing resistor connected between said base electrode and a source of biasing potential.

6. Apparatus in accordance with claim 2 including resistive means shunting said light-emitting diode thereby effectively increasing the slope of the I vs. R characteristic curves of said photoresistive devices.

7. Apparatus in accordance with claim 2 wherein each of said equalizer networks comprises, respectively, a resistive device in series relation with said photoresistive device and a capacitive device connected between the common terminal of said last two named devices and a reference potential.

* * * * *